United States Patent
Takada et al.

(10) Patent No.: US 8,994,326 B2
(45) Date of Patent: Mar. 31, 2015

(54) RESONANCE-TYPE NON-CONTACT POWER SUPPLY SYSTEM

(75) Inventors: Kazuyoshi Takada, Kariya (JP); Sadanori Suzuki, Kariya (JP); Shimpei Sakoda, Kariya (JP); Yukihiro Yamamoto, Kiriya (JP); Shinji Ichikawa, Toyota (JP); Toru Nakamura, Toyota (JP)

(73) Assignees: Kabushiki Kaisha Toyota Jidoshokki (JP); Toyota Jidosha Kabushiki Kaisha (JP)

( * ) Notice: Subject to any disclaimer, the term of this patent is extended or adjusted under 35 U.S.C. 154(b) by 363 days.

(21) Appl. No.: 13/697,740

(22) PCT Filed: May 12, 2011

(86) PCT No.: PCT/JP2011/060942
§ 371 (c)(1),
(2), (4) Date: Nov. 13, 2012

(87) PCT Pub. No.: WO2011/142419
PCT Pub. Date: Nov. 17, 2011

(65) Prior Publication Data
US 2013/0063085 A1    Mar. 14, 2013

(30) Foreign Application Priority Data
May 14, 2010 (JP) ................................ 2010-112097

(51) Int. Cl.
*H01M 10/16* (2006.01)
*H01M 10/48* (2006.01)
(Continued)

(52) U.S. Cl.
CPC ............. *H01M 10/48* (2013.01); *B60L 11/182* (2013.01); *B60L 2210/10* (2013.01); *B60L 2210/30* (2013.01); *B60L 2250/10* (2013.01);
(Continued)

(58) Field of Classification Search
USPC .......................... 320/104, 107, 108, 114, 115
See application file for complete search history.

(56) References Cited

U.S. PATENT DOCUMENTS

| 8,204,531 | B2 * | 6/2012 | Jin et al. | 320/108 |
| 2006/0071632 | A1 * | 4/2006 | Ghabra et al. | 320/108 |

(Continued)

FOREIGN PATENT DOCUMENTS

| CN | 101313634 | 11/2008 |
| CN | 201230219 | 4/2009 |

(Continued)

*Primary Examiner* — Edward Tso
(74) *Attorney, Agent, or Firm* — Baker & Hostetler LLP

(57) ABSTRACT

Movable body equipment is provided with: a secondary-side resonance coil, which receives power from a primary-side resonance coil of power supply equipment; a rectifier, which rectifies the power received by the secondary-side resonance coil; and a secondary battery, to which to which the power rectified by the rectifier is supplied. A resonance-type non-contact power supply system is provided with: state of charge detection units, which detect the state of charge of the secondary battery; and an impedance estimation unit, which estimates an impedance estimation value for the secondary battery on the basis of the state of charge of the secondary battery. When the absolute value of the difference between the impedance estimation value and the current impedance value of the secondary battery exceeds a threshold, a determination unit determines that a foreign body is present between the primary-side resonance coil and the secondary-side resonance coil.

5 Claims, 2 Drawing Sheets

(51) Int. Cl.
*B60L 11/18* (2006.01)
*H01M 10/46* (2006.01)
*H02J 5/00* (2006.01)

(52) U.S. Cl.
CPC .............. *H01M10/46* (2013.01); *H02J 5/005* (2013.01); *Y02T 10/7005* (2013.01); *Y02T 10/7088* (2013.01); *Y02T 10/7216* (2013.01); *Y02T 10/7241* (2013.01); *Y02T 90/122* (2013.01); *Y02T 90/127* (2013.01); *Y02T 90/14* (2013.01); *H01M 2220/20* (2013.01); *B60L 2260/44* (2013.01)
USPC ........................................................ 320/108

(56) References Cited

U.S. PATENT DOCUMENTS

| | | |
|---|---|---|
| 2007/0103650 A1 | 5/2007 | Takagi et al. |
| 2009/0058190 A1 | 3/2009 | Tanaka |
| 2009/0066440 A1 | 3/2009 | Chan Wai Po et al. |
| 2009/0127937 A1 | 5/2009 | Widmer et al. |
| 2009/0174364 A1* | 7/2009 | Onishi et al. .................. 320/108 |
| 2010/0013320 A1 | 1/2010 | Shiozaki et al. |
| 2010/0052431 A1 | 3/2010 | Mita |
| 2010/0225271 A1 | 9/2010 | Oyobe et al. |
| 2011/0049995 A1 | 3/2011 | Hashiguchi |
| 2011/0241440 A1 | 10/2011 | Sakoda et al. |

FOREIGN PATENT DOCUMENTS

| | | |
|---|---|---|
| EP | 2031729 A2 | 3/2009 |
| EP | 2290782 | 7/2010 |
| JP | 11-188113 | 7/1999 |
| JP | 2000-287369 | 10/2000 |
| JP | 2001-238372 | 8/2001 |
| JP | 2002-064403 | 2/2002 |
| JP | 2006-115592 | 4/2006 |
| JP | 2006-230032 | 8/2006 |
| JP | 2009-106136 | 5/2009 |
| JP | 2009-118587 | 5/2009 |
| JP | 2010-028937 | 2/2010 |
| JP | 2010-063245 | 3/2010 |
| JP | 2010-074937 | 4/2010 |
| JP | 2010-141977 | 6/2010 |
| JP | 2011-050140 | 3/2011 |
| WO | WO 2010/035321 | 4/2010 |
| WO | WO 2010/067763 | 6/2010 |
| WO | WO 2011/142417 | 11/2011 |
| WO | WO 2011/142418 | 11/2011 |
| WO | WO 2011/142419 | 11/2011 |
| WO | WO 2011/142420 | 11/2011 |

* cited by examiner

RESONANCE-TYPE NON-CONTACT POWER SUPPLY SYSTEM

CROSS-REFERENCE TO RELATED APPLICATIONS

This application is the National Stage of International Application No. PCT/JP2011/060942, filed May 12, 2011, which claims the benefit of Japanese Application No. 2010-112097, filed May 14, 2010, the disclosures of which are incorporated herein by reference in their entireties.

TECHNICAL FIELD

Field of The Invention

The present invention relates to a resonance type non-contact power supply system, and more particularly, to a resonance type non-contact power supply system provided with a secondary battery on a power reception side.

BACKGROUND OF THE INVENTION

To efficiently supply (feed) electric power from an AC power source to a power reception side, a resonance type non-contact power supply system must efficiently transmit the electric power from the AC power source to a resonance system. For such efficient electric power supply by the resonance type non-contact power supply system, the input impedance of the resonance system at a predetermined resonance frequency of the resonance system must be matched with the output impedance of the AC power source (a high-frequency power source). However, if a foreign object exists between a power supply side (a power transmission side) and the power reception side after the impedances have been matched, the impedances become unmatched, which hampers efficient electric power supply.

Conventionally, a non-contact charging apparatus having a power source device incorporating a primary-side high frequency oscillation circuit and a main body electromagnetically connected to the power source device is known. The main body receives secondary output through electromagnetic induction brought about by high frequency output from the high frequency oscillation circuit and charges a storage battery with the secondary output. Japanese Laid-Open Patent Publication No. 2006-115592, for example, proposes determination means for determining whether the main body is attached accurately to the power source device for such non-contact charging apparatuses. Specifically, when the main body is attached accurately to the power source device, a predetermined level of electric power is supplied to a primary coil if impedances are matched as designed. However, the main body may be displaced with respect to the power source device and thus attached inaccurately to the power source device. Also, the main body may be separated from the power source device and thus detached from the power source device. Further, a conductive foreign object may be placed inadvertently in a recess of a main body attachment portion, which is formed in the power source device to receive the main body. In these cases, the determination means of Japanese Laid-Open Patent Publication No. 2006-115592determines that these problems have occurred through a decrease in the electric current flowing in a primary coil, which is caused by unmatched impedances.

SUMMARY OF THE INVENTION

As has been described, when a foreign object exits between the main body and the power source device, the determination means of Patent Document 1 determines that there is a problem by using the fact that the electric current in the primary coil decreases. However, the determination means does not address a case where a foreign object exists between the power source device (the power supply side) and the main body (the power reception side) after the main body is properly attached to the main body attachment portion of the power source device.

Accordingly, it is an objective of the present invention to provide a resonance type non-contact power supply system capable of detecting a foreign object that is located between a power supply side and a power reception side and may adversely influence electric power transmission from the power supply side to the power reception side, without employing a dedicated sensor for detecting foreign objects.

To achieve the foregoing objective and in accordance with one aspect of the present invention, a resonance type non-contact power supply system is provided that includes power supply equipment, movable body equipment, a state of charge detecting section, an impedance estimating section, and a determining section. The power supply equipment includes an AC power source and a primary-side resonance coil, which receives power supply from the AC power source. The movable body equipment includes a secondary-side resonance coil, which receives electric power from the primary-side resonance coil, a rectifier, which rectifies electric power received by the secondary-side resonance coil, a charger, to which electric power rectified by the rectifier is supplied, and a secondary battery, which is connected to the charger. The state of charge detecting section detects a state of charge of the secondary battery. The impedance estimating section obtains an impedance estimate by estimating an impedance of the secondary battery based on a detection signal from the state of charge detecting section. The determining section determines that there is a foreign object between the primary-side resonance coil and the secondary-side resonance coil when the absolute value of the difference between the impedance estimate and a current impedance, which is the current value of the impedance of the secondary battery, exceeds a threshold value.

According to the present invention, the state of charge detecting section detects the state of charge of the secondary battery. The impedance estimating section estimates the impedance of the secondary battery based on a detection signal from the state of charge detecting section. When the absolute value of the difference between an impedance estimate obtained by the impedance estimating section and the current impedance of the secondary battery exceeds a threshold value, the determining section determines that there is a foreign object between the primary-side resonance coil and the secondary-side resonance coil. As a result, the determining section detects the foreign object that may adversely influence electric power transmission from the power supply side to the power reception side, without employing a dedicated sensor.

Accordingly, the present invention provides a resonance type non-contact power supply system capable of detecting a foreign object that may adversely influence electric power transmission from a power supply side to a power reception side, without employing a dedicated sensor for detecting foreign objects.

DETAILED DESCRIPTION OF THE PREFERRED EMBODIMENTS INVENTION

Figure 1:
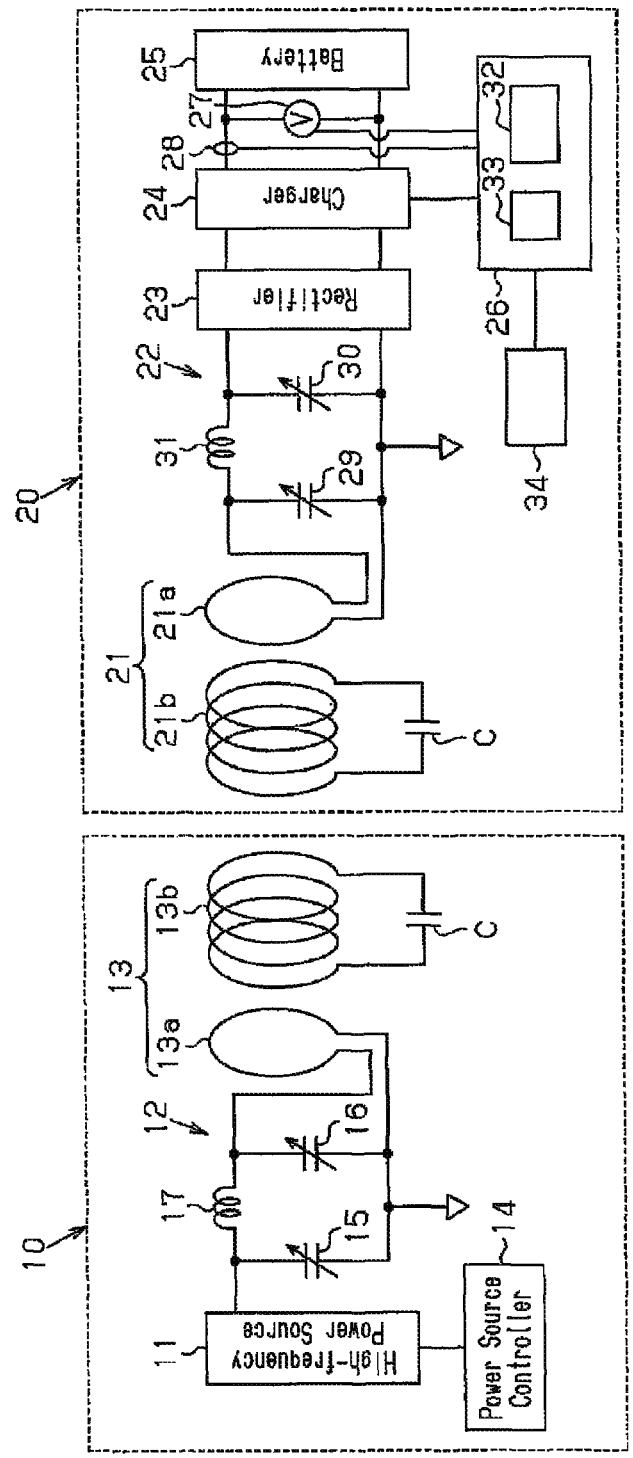
FIG. 1 is a diagram representing the configuration of a resonance type non-contact power supply system according to one embodiment.
Figure 2:
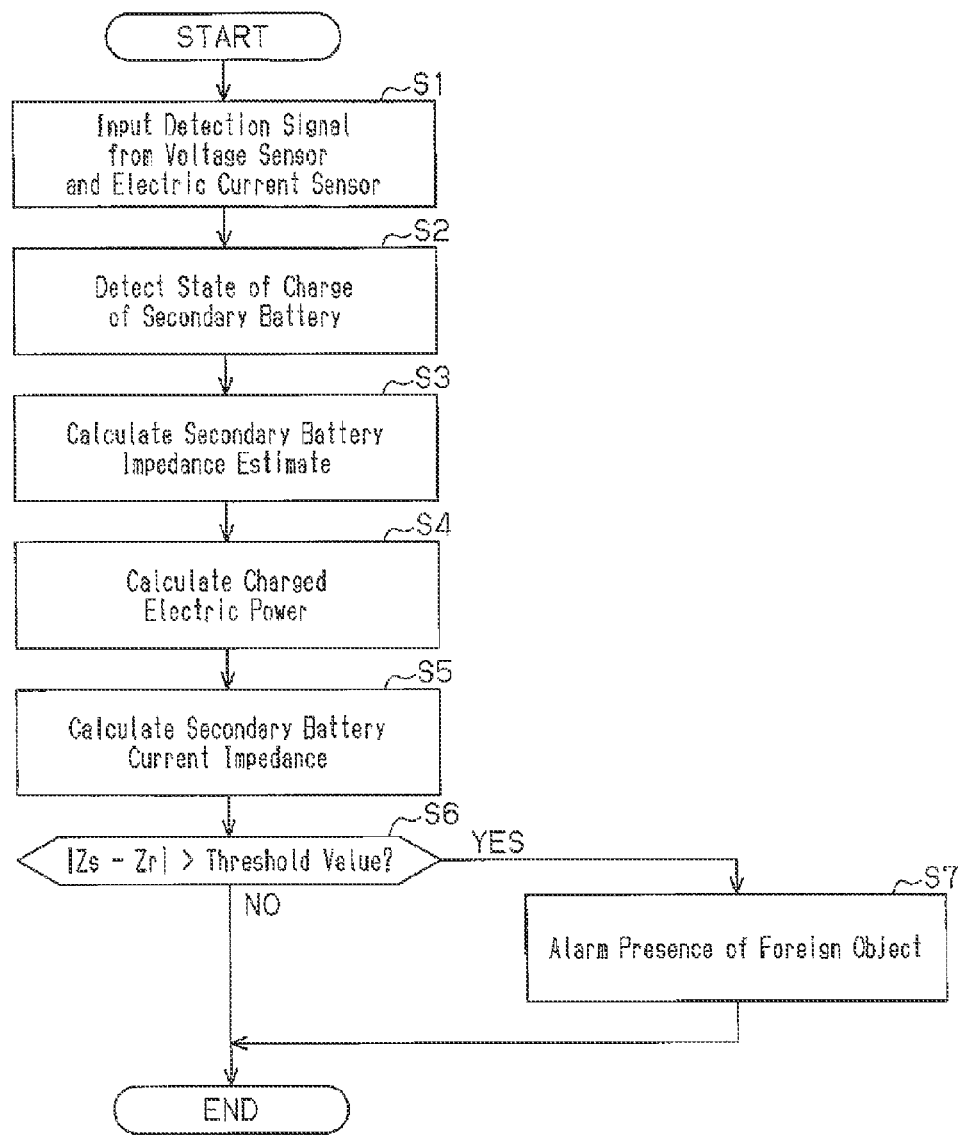
FIG. 2 is a flowchart representing the steps of a foreign object determination procedure performed by the vehicle-mounted controller illustrated in FIG. 1 to detect a foreign object.

FIGS. 1 and 2 illustrate a resonance type non-contact power supply system for charging a battery mounted in a vehicle according to one embodiment of the present invention.

As shown in FIG. 1, the resonance type non-contact power supply system includes power supply equipment 10 and movable body equipment 20. The power supply equipment 10 is power supply side equipment (power transmission side equipment) provided on the ground. The movable body equipment 20 is power reception side equipment mounted in a vehicle (automobile) as a movable body.

The power supply equipment 10 includes a high-frequency power source 11 as an AC power source, a primary matching unit 12, a primary coil device 13 and a power source controller 14. The power source controller 14 serving as a power source side controller sends a power source ON/OFF signal to the high-frequency power source 11. This signal turns the high-frequency power source 11 ON and OFF. The high-frequency power source 11 outputs AC electric power at a frequency that is equal to a preset resonant frequency of a resonance system of the resonance type non-contact power supply system, e.g., high-frequency electric power of about several MHz.

The primary coil device 13 serving as a primary-side coil includes a primary coil 13a and a primary-side resonance coil 13b. The primary coil 13a is connected to the high-frequency power source 11 through the primary matching unit 12. The primary coil 13a and the primary-side resonance coil 13b are located coaxially. The primary-side resonance coil 13b is connected to a capacitor C in parallel. The primary coil 13a is coupled to the primary-side resonance coil 13b by electromagnetic induction. AC electric power supplied from the high-frequency power source 11 to the primary coil 13a is supplied to the primary-side resonance coil 13b by electromagnetic induction.

The primary matching unit 12 as a primary-side matching unit includes two primary variable capacitors 15 and 16, which serve as variable reactances, and a primary inductor 17. One of the primary variable capacitors, 15, 16, or the primary variable capacitor 15, is connected to the high-frequency power source 11, and the other primary variable capacitor 16 is connected to the primary coil 13a in parallel. The primary inductor 17 is connected between the primary variable capacitors 15 and 16. By changing the capacities of the primary variable capacitors 15 and 16, the impedance of the primary matching unit 12 is changed. Each of the primary variable capacitors 15 and 16 is of known configuration having a rotary shaft (not shown), which is driven by a motor for example. If the motor is driven by a drive signal from the power source controller 14, the capacities of the primary variable capacitors 15 and 16 are changed.

The movable body equipment 20, which is a movable body side equipment, includes a secondary coil device 21, a secondary matching unit 22, a rectifier 23, a charger 24, a secondary battery 25 and a vehicle-mounted controller 26. The secondary battery 25 is a battery connected to the charger 24. The movable body equipment 20 further includes a voltage sensor 27, which detects voltage of the secondary battery 25, and a current sensor 28, which detects current flowing from the rectifier 23 to the charger 24. The vehicle-mounted controller 26, which serves as a vehicle side controller, calculates the charged electric power of the secondary battery 25 based on a detection signal from the voltage sensor 27 and a detection signal from the electric current sensor 28. The charger 24 includes a DC/DC converter (not shown), which converts DC rectified by the rectifier 23 into voltage suitable for charging the secondary battery 25. The vehicle-mounted controller 26 controls a switching element of a DC-DC converter mounted in the charger 24 when the secondary battery 25 is charged.

The secondary coil device 21 as a secondary-side coil includes a secondary coil 21a and a secondary-side resonance coil 21b. The secondary coil 21a and the secondary-side resonance coil 21b are arranged coaxially. The secondary-side resonance coil 21b is connected to another capacitor C, which is different from that of the primary-side resonance coil 13b. The secondary coil 21a is coupled to the secondary-side resonance coil 21b by electromagnetic induction. AC electric power supplied from the primary-side resonance coil 13b to the secondary-side resonance coil 21b by resonance is supplied to the secondary coil 21a by electromagnetic induction. The secondary coil 21a is connected to the secondary matching unit 22.

The number of turns and winding diameters of the primary coil 13a, the primary-side resonance coil 13b, the secondary-side resonance coil 21b and the secondary coil 21a are appropriately set corresponding to the magnitude of electric power to be supplied (transmitted) from the power supply equipment 10 to the movable body equipment 20.

In this embodiment, the resonance system includes the primary matching unit 12, the primary coil 13a, the primary-side resonance coil 13b, the secondary-side resonance coil 21b, the secondary coil 21a, the secondary matching unit 22, the rectifier 23, the charger 24 and the secondary battery 25.

The secondary matching unit 22, which is a secondary-side matching unit, includes two secondary variable capacitors 29 and 30 as variable reactances and a secondary inductor 31. The secondary inductor 31 is connected between the secondary variable capacitors 29 and 30. One of the secondary variable capacitors 29, 30, or the secondary variable capacitor 29 is connected to the secondary coil 21a in parallel, and the other secondary variable capacitor 30 is connected to the rectifier 23. By changing capacities of the secondary variable capacitors 29 and 30, the impedance of the secondary matching unit 22 is changed. Each of the secondary variable capacitors 29 and 30 is of known configuration having a rotary shaft (not shown), which is driven by a motor for example, and if the motor is driven by a drive signal from the vehicle-mounted controller 26, the capacities of the secondary variable capacitors 29 and 30 are changed.

The vehicle-mounted controller 26 includes a vehicle-mounted CPU 32 and a vehicle-mounted storage device (memory) 33. The vehicle-mounted storage device 33 stores the impedance of the secondary battery 25 in a normal state. The impedance of the secondary battery 25 in the normal state is obtained in advance through experimentation. The vehicle-mounted storage device 33 stores data representing the relationship between the state of charge (SOC: State of Charge) of the secondary battery 25 and the impedance of the secondary battery 25 with the primary-side resonance coil 13b and the secondary-side resonance coil 21b spaced from each other by a predetermined distance as a map or a relational expression. The vehicle-mounted controller 26 determines the state of charge of the secondary battery 25 using a detection signal from the voltage sensor 27. The vehicle-mounted controller 26 and the voltage sensor 27 configure a state of charge detecting section (state of charge detection means) for detecting the state of charge of the secondary battery 25. The vehicle-mounted controller 26 estimates the impedance of the secondary battery 25 from the data representing the state of charge of the secondary battery 25 and the impedance of the secondary battery 25. In other words, the vehicle-mounted controller 26 functions also as an impedance estimating section (impedance estimation means) for obtaining an impedance estimate Zs of the secondary battery 25 by estimating the impedance of the secondary battery 25 based on a detection signal from the state of charge detecting section.

Specifically, the vehicle-mounted storage device 33 stores the data representing the relationship between the impedance of the secondary battery 25 and the charged electric power, which is determined in advance through experimentation as a map or a relational expression. Using the data, the vehicle-mounted controller 26 obtains a current impedance Zr as the current impedance of the secondary battery 25 based on the charged electric power at the time when the secondary battery 25 is charged. When the absolute value of the difference between the impedance estimate Zs obtained by the impedance estimating section and the current impedance Zr of the secondary battery 25 exceeds a threshold value, the vehicle-mounted controller 26 determines that there is a foreign object between the primary-side resonance coil 13b and the secondary-side resonance coil 21b. That is, the vehicle-mounted controller 26 functions also as a determining section (determination means) for determining whether a foreign object exists between the primary-side resonance coil 13b and the secondary-side resonance coil 21b. The threshold value is set to a value greater than the range of variation of the impedance estimate Zs in non-contact electric power supply from the power supply equipment 10 to the movable body equipment 20 with the vehicle stopped at a predetermined stop-for-charging position. Such variation is caused by an error regarding the stop-for-charging position or an error in detection of the state of charge.

Operation of the resonance type non-contact power supply system, which is configured as described above, will hereafter be described.

To charge the secondary battery 25 mounted in a vehicle, the user, for example, an occupant of the vehicle, stops the vehicle at a predetermined stop-for-charging position in the power supply equipment 10. After the vehicle is stopped at the stop-for-charging position in the power supply equipment 10, the vehicle-mounted controller 26 sends a power supply request signal to the power source controller 14. In response to the power supply request signal, the power source controller 14 starts transmitting electric power. Specifically, the high-frequency power source 11 of the power supply equipment 10 supplies AC voltage at the resonance frequency to the primary coil 13a. The electric power is thus transmitted in a non-contact manner from the primary-side resonance coil 13b to the secondary-side resonance coil 21b through resonance. The electric power received by the secondary-side resonance coil 21b is fed to the charger 24 through the secondary matching unit 22 and the rectifier 23 to charge the secondary battery 25, which is connected to the charger 24.

When the secondary battery 25 mounted in a vehicle is to be charged, there may be cases where the vehicle cannot be stopped at the stop-for-charging position for ensuring efficient non-contact electric power supply from the power supply equipment 10 to the movable body equipment 20. Accordingly, prior to charging, the primary matching unit 12 and the secondary matching unit 22 may be adjusted.

When the secondary battery 25 is charged, the state of charge (SOC) of the secondary battery 25 changes and thus varies the input impedance of the resonance system at the resonance frequency of the resonance system. As a result, the input impedance of the resonance system becomes unmatched with the high-frequency power source 11. This increases the reflected electric power from the resonance system to the high-frequency power source 11, thus hampering efficient electric power supply from the power supply equipment 10 to the movable body equipment 20. To avoid this, the vehicle-mounted controller 26 adjusts the impedance of the secondary matching unit 22 to a suitable value in correspondence with the state of charge of the secondary battery 25 when the secondary battery 25 is charged, such that electric power is supplied efficiently from the power supply equipment 10 to the movable body equipment 20 to charge the secondary battery 25 efficiently, regardless of a change in the state of charge of the secondary battery 25 that occurs when the secondary battery 25 is charged.

The flowchart of FIG. 2 represents a procedure for determining whether there is a foreign object, which is performed by the vehicle-mounted controller 26 at predetermined cycles. In step S1, the vehicle-mounted controller 26 receives a detection signal from the voltage sensor 27 and a detection signal from the electric current sensor 28. In step S2, the vehicle-mounted controller 26 detects the state of charge of the secondary battery 25 from the detection signal from the voltage sensor 27. In step S3, the vehicle-mounted controller 26 estimates (calculates) the impedance estimate Zs of the secondary battery 25 using the data representing the relationship between the state of charge of the secondary battery 25 and the impedance of the secondary battery 25. Then, in step S4, the vehicle-mounted controller 26 calculates the charged electric power of the secondary battery 25 based on the detection signal from the voltage sensor 27 and the detection signal from the electric current sensor 28. In step S5, the vehicle-mounted controller 26 determines the current impedance Zr of the secondary battery 25 using the data representing the relationship between the impedance and the charged electric power of the secondary battery 25.

Subsequently, in step S6, the vehicle-mounted controller 26 determines whether the absolute value of the difference (|Zs−Zr|) between the impedance estimate Zs, which has been estimated from the state of charge of the secondary battery 25 in step S3, and the current impedance Zr, which has been determined using the charged electric power of the secondary battery 25 in step S5, exceeds the threshold value. When the absolute value of the impedance difference is smaller than or equal to the threshold value, the vehicle-mounted controller 26 determines that there is no foreign object and terminates the procedure. If the absolute value of the impedance difference exceeds the threshold value, the vehicle-mounted controller 26 determines that there is a foreign object between the primary-side resonance coil 13b and the secondary-side resonance coil 21b and carries out step S7. In step S7, the vehicle-mounted controller 26 outputs an alarming command signal indicating the presence of the foreign object to an alarm device 34 (shown in FIG. 1). After the alarm device 34 generates an alarm indicating the presence of the foreign object, the procedure is terminated. The alarm device 34 is preferably a display device that generates a visual display for an occupant of the vehicle but may be an audio alarm device that produces sound.

When there is a foreign object between the primary-side resonance coil 13b and the secondary-side resonance coil 21b, changes occur in not only the impedance of the secondary battery 25 but also the input impedance of the resonance system as a whole (including the primary coil 13a, the primary-side resonance coil 13b, the secondary-side resonance coil 21b, and the secondary coil 21a) measured at another position in the resonance system, which is, for example, opposite ends of the primary coil 13a.

The vehicle-mounted controller 26 determines whether charging is completed using the time that has elapsed from the time point at which, for example, the voltage of the secondary battery 25 reached a predetermined level. When charging is complete, the vehicle-mounted controller 26 sends a charging completion signal to the power source controller 14. In response to the charging completion signal, the power source controller 14 terminates electric power transmission. As has been described, in the illustrated embodiment, it is determined that there is a foreign object between the power supply side and the power reception side when there is a great difference between the impedance estimate Zs obtained using the state of charge (SOC) of the secondary battery 25 and the current impedance Zr.

This embodiment has the following advantages.

(1) The resonance type non-contact power supply system includes the power supply equipment 10 and the movable body equipment 20. The power supply equipment 10 has the AC power source (the high-frequency power source 11) and the primary-side resonance coil 13b, which receives electric power from the AC power source. The movable body equipment 20 includes the secondary-side resonance coil 21b, which receives the electric power from the primary-side resonance coil 13b. The movable body equipment 20 also includes the rectifier 23 for rectifying the electric power received by the secondary-side resonance coil 21b, the charger 24 to which the electric power rectified by the rectifier 23 is supplied, the secondary battery 25 connected to the charger 24, the state of charge detecting section (the state of charge detection means) for detecting the state of charge of the secondary battery 25, and the impedance estimating section for estimating the impedance of the secondary battery 25 based on the state of charge of the secondary battery 25. The resonance type non-contact power supply system further includes the determining section (the vehicle-mounted controller 26), which determines that there is a foreign object between the primary-side resonance coil 13b and the secondary-side resonance coil 21b when the absolute value of the difference between the impedance estimate Zs, which is obtained by the impedance estimating section, and the current impedance Zr of the secondary battery 25 exceeds the threshold value. As a result, in the illustrated embodiment, detection of a foreign object that exits between the power supply side (the power supply equipment 10) and the power reception side (the movable body equipment 20) and may adversely influence electric power transmission from the power supply equipment 10 to the movable body equipment 20 is accomplished without employing a dedicated sensor for such detection.

(2) The vehicle-mounted controller 26 determines the current impedance Zr of the secondary battery 25 using the data representing the relationship between the impedance of the secondary battery 25 obtained in advance through experimentation and the charged electric power of the secondary battery 25. The charged electric power of the secondary battery 25 is used to adjust the secondary matching unit 22 when the secondary battery 25 is charged. As a result, in the illustrated embodiment, detection of the charged electric power of the secondary battery 25 only for the purpose of determining the impedance of the secondary battery 25 is unnecessary. This prevents complication of the procedure performed by the vehicle-mounted controller 26 or the design of the vehicle-mounted controller 26.

(3) When the vehicle-mounted controller 26 determines that there is a foreign object between the primary-side resonance coil 13b and the secondary-side resonance coil 21b, the alarm device 34 generates an alarm indicating the presence of the foreign object. This makes it easy for an occupant of the vehicle to recognize the presence of the foreign object and perform a necessary procedure (for example, removal of the foreign object).

The present invention is not restricted to the illustrated embodiment but may be embodied in the forms described below.

The vehicle-mounted controller 26 may calculate the state of charge of the secondary battery 25 through progression of charging and discharging of the secondary battery 25, instead of detecting the state of charge of the secondary battery 25 using the detection signal from the voltage sensor 27. The vehicle-mounted controller 26 is allowed to detect the state of charge of the secondary battery 25 with improved accuracy by calculating the state of charge of the secondary battery 25 through progression of charging and discharging of the secondary battery 25.

The current impedance Zr of the secondary battery 25 may be determined by any other suitable method, instead of using the data representing the relationship between the impedance of the secondary battery 25 and the charged electric power, which is obtained in advance through experimentation. For example, the vehicle-mounted storage device 33 may store data representing the relationship between the output of the high-frequency power source 11 after adjustment of the secondary matching unit 22 performed when the secondary battery 25 is charged and the impedance of the secondary battery 25. The vehicle-mounted controller 26 thus determines the current impedance Zr of the secondary battery 25 through detection of the output of the high-frequency power source 11.

The vehicle-mounted controller 26 may employ a first threshold value and a second threshold value, which is greater than the first threshold value, as threshold values for determining whether there is a foreign object. For example, if the absolute value of the difference between the impedance estimate Zs and the current impedance Zr is greater than the second threshold value, the vehicle-mounted controller 26 may stop electric power supply from the power supply equipment 10. The second threshold value is set to, for example, the absolute value of the aforementioned difference in a case in which the reflected electric power from the resonance system to the high-frequency power source 11 is great and charging efficiency decreases to a significant extent. When determining that the aforementioned absolute value is greater than the second threshold value, the vehicle-mounted controller 26 transmits the result of determination wirelessly to the power source controller 14. In response to the result of determination, the power source controller 14 suspends charging and activates, for example, an alarm generating section (abnormality alarm generation means, not shown).

The power supply equipment 10 (for example, the power source controller 14) may include the determining section, which determines that there is a foreign object between the primary-side resonance coil 13b and the secondary-side resonance coil 21b when the absolute value of the difference between the impedance estimate Zs obtained by the impedance estimating section and the current impedance Zr of the secondary battery 25 exceeds the threshold value. The power supply equipment 10 may also have the alarm device 34, which generates an alarm indicating the presence of the foreign object. Specifically, the alarm device must be located at such a position in the power supply equipment 10 that an occupant of the vehicle can easily view. This case, in which the alarm device is installed in the power supply equipment 10, needs to employ only a limited number of alarm devices compared to, for example, a case in which respective vehicles are equipped with their own alarm devices, which generate an alarm indicating the presence of a foreign object.

To perform non-contact electric power supply from the power supply equipment 10 to the movable body equipment 20, the resonance type non-contact power supply system does not necessarily have to include all of the components including the primary coil 13a, the primary-side resonance coil 13b, the secondary coil 21a, and the secondary-side resonance coil 21b but may include at least the primary-side resonance coil 13b and the secondary-side resonance coil 21b. Specifically, instead of configuring the primary coil device 13 using the primary coil 13a and the primary-side resonance coil 13b, the primary coil device 13 may be formed without the primary coil 13a. In this case, the primary-side resonance coil 13b is connected to the high-frequency power source 11 through the primary matching unit 12. Also, instead of configuring the secondary coil device 21 with the secondary coil 21a and the secondary-side resonance coil 21b, the secondary coil device 21 may be formed without the secondary coil 21a. In this case, the secondary-side resonance coil 21b is connected to the rectifier 23 through the secondary matching unit 22. However, adjustment for ensuring a resonance state is accomplished comparatively easily in the resonance type non-contact power supply system having all of the primary coil 13a, the primary-side resonance coil 13b, the secondary coil 21a, and the secondary-side resonance coil 21b. Also, this configuration makes it easy to maintain the resonance state even when the primary-side resonance coil 13b and the secondary-side resonance coil 21b are spaced from each other by a great distance. The configuration having all of the aforementioned components is thus preferable.

A vehicle as the movable body means a vehicle including an electric motor that generates a travelling drive force, or an electric vehicle. That is, examples of vehicles to which the present invention is applied are an electric automobile, a hybrid vehicle in which an internal combustion engine is mounted together with an electric motor as power sources, and a vehicle in which the secondary battery 25 and a fuel battery are also mounted as DC power supplies for driving the vehicle. The vehicle as the movable body is not limited to one requiring a driver, and the vehicle may be an unmanned carrier.

The movable body is not limited to a vehicle. That is, the present invention may be applied to any type of movable body as long as the movable body may move away from the power supply equipment when the movable body is not charging. That is, the movable body may be a robot for example.

The primary matching unit 12 and the secondary matching unit 22 do not necessarily need to have two variable capacitors and an inductor. The inductor may be a variable inductor. Each of the primary matching unit 12 and the secondary matching unit 22 may include a variable inductor and two non-variable capacitors.

Neither the primary matching unit 12 nor the secondary matching unit 22 is restricted to the n shaped matching unit. These matching units 12, 22 may be a T or L shaped matching unit.

The high-frequency power source 11 may be configured to be capable of or incapable of changing the frequency of power AC voltage.

The primary matching unit 12 may be omitted from the power supply equipment 10. However, if the primary matching unit 12 is omitted, the movable body must be stopped accurately at the predetermined stop-for-charging position such that the distance between the primary-side resonance coil 13b and the secondary-side resonance coil 21b becomes equal to a preset value, in order to ensure efficient electric power supply from the power supply side to the power reception side.

The capacitor C connected to the primary-side resonance coil 13b may be omitted. Similarly, the capacitor C connected to the secondary-side resonance coil 21b may be omitted. However, if the capacitors C are respectively connected to the primary-side resonance coil 13b and the secondary-side resonance coil 21b, the resonant frequency can further be lowered as compared with a case where the capacitors C are omitted. If the resonant frequency is the same the primary-side resonance coil 13b and the secondary-side resonance coil 21b can be made compact if the capacitors C are respectively connected to the primary-side resonance coil 13b and the secondary-side resonance coil 21b as compared with the case where the capacitors C are omitted.

The invention claimed is:

1. A resonance type non-contact power supply system comprising:
   power supply equipment including an AC power source and a primary-side resonance coil, which receives power supply from the AC power source;
   movable body equipment including a secondary-side resonance coil, which receives electric power from the primary-side resonance coil, a rectifier, which rectifies electric power received by the secondary-side resonance coil, and a secondary battery, to which electric power rectified by the rectifier is supplied;
   a state of charge detecting section for detecting a state of charge of the secondary battery;
   an impedance estimating section for obtaining an impedance estimate by estimating an impedance of the secondary battery based on the state of charge of the secondary battery; and
   a determining section, which determines that there is a foreign object between the primary-side resonance coil and the secondary-side resonance coil when the absolute value of the difference between the impedance estimate and a current impedance, which is the current value of the impedance of the secondary battery, exceeds a threshold value.

2. The resonance type non-contact power supply system according to claim 1, wherein the movable body equipment is mounted and used in an electric vehicle.

3. The resonance type non-contact power supply system according to claim 1, wherein the determining section obtains the current impedance using data representing the relationship between the impedance of the secondary battery and a charged electric power of the secondary battery, which relationship is obtained in advance through experimentation.

4. The resonance type non-contact power supply system according to claim 1, further comprising an alarm device that is activated when the determining section determines the presence of the foreign object.

5. The resonance type non-contact power supply system according to claim 1, wherein the determining section stops electric power supply from the power supply equipment when the absolute value of the difference between the impedance estimate and the current impedance is greater than a second threshold value, which is greater than the threshold value.

* * * * *